US012522500B2

United States Patent
Pakhare et al.

(10) Patent No.: US 12,522,500 B2
(45) Date of Patent: Jan. 13, 2026

(54) SPRAY PYROLYSIS SYSTEM AND METHOD FOR MANUFACTURE OF MIXED METAL OXIDE COMPOSITIONS

(71) Applicant: PYROCHEM CATALYST COMPANY, Louisville, KY (US)

(72) Inventors: Devendra Pakhare, Louisville, KY (US); Jeffrey Baker Harrison, Louisville, KY (US); Joshua Aaron Gubitz, Louisville, KY (US); Timothy Griffith Fogarty, Prospect, KY (US); Timothy David Appleberry, Louisville, KY (US)

(73) Assignee: PYROCHEM CATALYST COMPANY, Louisville, KY (US)

( * ) Notice: Subject to any disclaimer, the term of this patent is extended or adjusted under 35 U.S.C. 154(b) by 401 days.

(21) Appl. No.: 17/759,689

(22) PCT Filed: Jan. 29, 2021

(86) PCT No.: PCT/US2021/015935
§ 371 (c)(1),
(2) Date: Jul. 28, 2022

(87) PCT Pub. No.: WO2021/155314
PCT Pub. Date: Aug. 5, 2021

(65) Prior Publication Data
US 2023/0097385 A1 Mar. 30, 2023

Related U.S. Application Data

(60) Provisional application No. 62/967,618, filed on Jan. 30, 2020.

(51) Int. Cl.
*B01D 1/18* (2006.01)
*B01D 3/34* (2006.01)
(Continued)

(52) U.S. Cl.
CPC .............. *C01B 13/185* (2013.01); *B01D 1/18* (2013.01); *B01D 3/346* (2013.01); *B01J 6/008* (2013.01);
(Continued)

(58) Field of Classification Search
CPC ........ C01B 13/185; B01D 1/18; B01D 3/346; B01J 6/008; B01J 27/25; B05B 9/0423
See application file for complete search history.

(56) References Cited

U.S. PATENT DOCUMENTS 5,114,702 A * 5/1992 Pederson ............... B82Y 30/00
423/639
5,234,881 A 8/1993 Narula et al.
(Continued)

FOREIGN PATENT DOCUMENTS

DE 102019210282 A1 * 1/2020 ............ B01J 19/241
EP 0703188 A1 * 3/1996 ............. C01B 13/18
(Continued)

OTHER PUBLICATIONS

EESR Issued in European Patent Application No. EP21748009.4 on Jan. 22, 2024.
(Continued)

*Primary Examiner* — Wayne A Langel
(74) *Attorney, Agent, or Firm* — HULTQUIST, PLLC; Steven J. Hultquist (57) ABSTRACT

A spray pyrolysis system and method are described for manufacture of mixed metal oxide compositions, e.g., mixed metal oxide catalyst compositions having utility for gas processing applications such as hydrogenation, dehydrogenation, reduction, and oxidation. Mixed metal oxide automotive exhaust catalyst compositions produced by such system and method achieve a substantial reduction in temperatures required for removal of automotive exhaust pol-
(Continued)

lutant species, as compared to catalyst produced by conventional batch precipitation techniques. The spray pyrolysis system and method enable catalytic metal(s) to be integrally incorporated in the mixed metal oxide composition, thereby obviating a separate catalytic metal impregnation operation.

13 Claims, 2 Drawing Sheets

(51) Int. Cl.
    *B01J 6/00*       (2006.01)
    *B01J 27/25*    (2006.01)
    *B05B 9/04*     (2006.01)
    *C01B 13/18*   (2006.01)

(52) U.S. Cl.
    CPC ............. *B01J 27/25* (2013.01); *B05B 9/0423* (2013.01); *B01J 2219/00054* (2013.01)

(56) References Cited

U.S. PATENT DOCUMENTS

| | | | |
|---|---|---|---|
| 6,967,183 | B2 | 11/2005 | Smith-Hampden et al. |
| 9,126,833 | B2 | 9/2015 | Berry et al. |
| 2002/0078824 | A1 | 6/2002 | Tom et al. |
| 2008/0085103 | A1 | 4/2008 | Beland et al. |
| 2008/0318761 | A1 | 12/2008 | Riedel et al. |
| 2009/0181846 | A1 | 7/2009 | Lim et al. |
| 2009/0305881 | A1 | 12/2009 | Sietsma et al. |
| 2010/0102700 | A1 * | 4/2010 | Jaiswal ............... C01G 1/02 422/187 |
| 2015/0102514 | A1 | 4/2015 | Wang et al. |
| 2015/0360208 | A1 | 12/2015 | Konig et al. |
| 2019/0054449 | A1 | 2/2019 | Bukhovko et al. |

FOREIGN PATENT DOCUMENTS

| | | | |
|---|---|---|---|
| JP | 9262470 A | 10/1997 | |
| JP | 2007290885 A | 11/2007 | |
| JP | 2009148758 A | 7/2009 | |
| WO | WO-9426657 A1 * | 11/1994 | ............. B01J 19/24 |
| WO | WO 98/37165 * | 8/1998 | ............. C09K 11/08 |
| WO | 2015121248 A1 | 8/2015 | |
| WO | 2016108760 A1 | 7/2016 | |

OTHER PUBLICATIONS

Shih, S-J, et al., "Fabrication of ceria particles using glycine nitrate spray pyrolosis", Surface & Coatings Technology, 2014, pp. 302-309, vol. 259, Publisher: Elsevier.

Aguirre, S.B., et al., "One-pot synthesis of uniform hollow nanospheres of Ce—Zr—O mixed oxides by spray pyrolysis", Microporous and Mesoporous Materials, 2020, vol. 294, 109886, Publisher: Elsevier.

* cited by examiner

SPRAY PYROLYSIS SYSTEM AND METHOD FOR MANUFACTURE OF MIXED METAL OXIDE COMPOSITIONS

CROSS-REFERENCE TO RELATED APPLICATION

This is a U.S. national phase under 35 USC $371 of International Patent Application PCT/US 2021/015935 filed on Jan. 29, 2021 in the names of Devendra Pakhare, Jeffrey Baker Harrison, Joshua Aaron Gubitz, Timothy Griffith Fogarty, and Timothy David Appleberry for "Spray Pyrolysis System and Method for Manufacture of Mixed Metal Oxide Compositions" which in turn claims the benefit under 35 USC § 119 of U.S. Provisional Patent Application 62/967,618 filed Jan. 30, 2020 in the names of Devendra Pakhare, Jeffrey Baker Harrison, Joshua Aaron Gubitz, Timothy Griffith Fogarty, and Timothy David Appleberry for "Spray Pyrolysis System and Method for Manufacture of Mixed Metal Oxide Compositions". The disclosures of such applications are hereby incorporated herein by reference, in their respective entireties, for all purposes.

FIELD

The present disclosure relates to a spray pyrolysis system and method for manufacture of mixed metal oxide compositions, e.g., mixed metal oxide catalyst compositions having utility for gas processing applications such as hydrogenation, dehydrogenation, reduction, and oxidation.

DESCRIPTION OF THE RELATED ART

In the conventional production of multicomponent mixed metal oxide compositions for use as gas processing catalysts, liquid phase precipitation processes carried out in batch processing operations are extensively used for manufacture. Such conventional batch methods are complex and time-consuming, as well as costly in character. These characteristics of complexity, extensive time frames, and cost, as well as the limitations of product volume associated with batch processing, represent substantial deficiencies of the conventional liquid phase precipitation processes.

It therefore would be a substantial advance in the art to provide a continuous, high rate production process and apparatus that are free of such deficiencies.

SUMMARY

The present disclosure relates to a spray pyrolysis system and method for manufacture of mixed metal oxide compositions.

In one aspect, the disclosure relates to a spray pyrolysis system for production of a mixed metal oxide, such system comprising:
  a spray pyrolysis reactor including an interior volume arranged to receive an atomized spray of droplets of a liquid composition and an oxygen-containing gas for contacting of the liquid composition droplets with the oxygen-containing gas in the interior volume, and to discharge the mixed metal oxide and effluent gases from the interior volume after said contacting;
  an atomizer arranged to receive the liquid composition from a liquid composition source containing same and to discharge the atomized spray of droplets of the liquid composition into the interior volume for said contacting;
  the liquid composition source containing the liquid composition, the liquid composition including at least one mixed metal oxide precursor and at least one solvent or fuel;
  an oxygen-containing gas source containing said oxygen-containing gas, said oxygen-containing gas source being coupled in gas supply relationship with the spray pyrolysis reactor to deliver the oxygen-containing gas to the interior volume of the spray pyrolysis reactor; and
  a thermal management system arranged to maintain temperature in the interior volume of the spray pyrolysis reactor at a temperature or in a temperature range that supports successive droplet evaporation, reaction/decomposition, crystallization, and mixed metal oxide formation in the reactor.

In another aspect, the disclosure relates to process for producing a mixed metal oxide, such process comprising:
  generating an atomized spray of droplets including at least one mixed metal oxide precursor and at least one solvent or fuel;
  contacting the atomized spray of droplets with an oxygen-containing gas at elevated temperature that supports successive droplet evaporation, reaction/decomposition, and mixed metal oxide formation; and
  recovering the mixed metal oxide from effluent gases produced by said contacting.

Other aspects, features and embodiments of the disclosure will be more fully apparent from the ensuing description and appended claims.

DETAILED DESCRIPTION

The present disclosure relates to a spray pyrolysis system and process for production of mixed metal oxide compositions. The system and process of the present disclosure enable simple, efficient, cost-effective, and continuous production of mixed metal oxide materials. The mixed metal oxide compositions produced using the system and process of the present disclosure may be of crystalline and/or non-crystalline character, and are particularly useful for forming heterogeneous catalysts for gas processing applications such as hydrogenation, dehydrogenation, reduction, and oxidation.

The system and process of the present disclosure achieve a remarkable advance in the art, in the high-volume production of mixed metal oxide compositions in a continuous process carried out in with processing time of seconds or minutes, as opposed to conventional batch operation processes heretofore used for making mixed metal oxide compositions and involving processing times on the order of hours and days.

The system and process of the present disclosure employ rapid heat transfer involving atomized droplets of source liquid composition introduced to a spray pyrolysis reactor for gas-liquid contact with an oxygen-containing gas in drying and pyrolysis operations to produce the mixed metal oxide product in a powder form that is recovered from the drying gas.

The spray pyrolysis reactor is arranged to receive a source liquid composition that includes reactant components for the mixed metal oxide product. The source liquid composition may contain metal salts or other precursor (source reagent) materials as reactant, e.g., oxidizer, component(s), as well as solvent and/or fuel component(s) appropriate to the drying and pyrolysis operations for producing the mixed metal oxide product.

The atomizer device that is used to generate droplets of source liquid composition introduced into the spray pyrolysis reactor may be of any suitable type, as for example a rotary atomizer, centrifugal atomizer, nebulizer, ultrasonic disperser, nozzle, or combination of two or more of the foregoing, as effective to generate the spray of droplets of the source liquid composition for the given spray the pyrolysis process. Nozzles, when employed, may be of any suitable type, such as ultrasonic, pneumatic, hydraulic, venturi, or other type or types that create a fine or atomizing spray. The atomizer device may be constructed and arranged to produce a spray pattern that may be conical, flat fan, twin fan, hollow cone, or other form or configuration, or combinations thereof. A rotating geometry pattern may also be utilized. The droplets in the spray of droplets produced by the atomizer device may be of any suitable droplet size and/or droplet size distribution that is efficacious in the given application of the system and process of the present disclosure. In various embodiments, the atomizer device employed will produce a spray of droplets having size in a range of from 0.1 μm to 500 μm, although in other embodiments droplet sizes of smaller or larger size, e.g., of nano-scale to micron-scale range, may be employed as desired and effective to achieve the mixed metal oxide product. The liquid flow rate and droplet production rate may be widely varied within the scope of the present disclosure, in providing suitable sprays of droplets in the operation of the spray pyrolysis system.

It will be appreciated that various factors influence droplet size of the spray of droplets produced by the atomizer device, including for example: (i) the nozzle/spray system design and spray pattern; (ii) atomizer operating frequencies in the case of ultrasonic nozzle/spray systems; (iii) source liquid characteristics, including composition, viscosity, flow rate, delivery pressure, and temperature; and (iv) oxygen-containing gas characteristics, including composition, pressure, flow rate, and temperature. It will be understood that selections and operating conditions of the spray pyrolysis system for production of particular mixed metal oxide compositions may be readily specified and/or empirically determined within the skill of the art, based on such factors, and the description herein.

The source liquid composition may be delivered into the atomizer device at any suitable conditions that are effective to produce a desired spray of droplets in the spray pyrolysis reactor. In various embodiments, the source liquid composition may be supplied from a source such as a reservoir, tank, vessel, pipeline or other source apparatus, and may be delivered from such source apparatus to the atomizer device by a pump, compressor, or other motive driver device. For example, any of a variety of liquid pumps, such as syringe pumps, gear pumps, pulse pumps, or peristaltic pumps, may be employed. In specific implementations, the source liquid composition may be delivered to the atomizer device at pressure in a range of from 1.1 atm to 20 atm, although any other pressures, greater than or less than the pressures in such range may be employed as appropriate to achievement of specific mixed metal oxide products.

The oxygen-containing gas used in the spray pyrolysis process may be of any suitable type that is efficacious for the drying and pyrolysis operations in the spray pyrolysis reactor. For example, the oxygen-containing gas may include oxygen, ozone, air, oxygen-enriched air, nitrogen oxides, or mixtures of any two or more of the foregoing, or any other oxygen-containing gases that are advantageously employed in the drying and pyrolysis operations producing the mixed metal oxide product.

The oxygen-containing gas is supplied to the spray pyrolysis reactor from a suitable gas source, which may for example include conventional gas storage and dispensing cylinders, tanks, to trailers, pipelines, etc. Such oxygen-containing gas may be delivered at any appropriate pressure, temperature, and flow rate for the drying and pyrolysis operations in the spray pyrolysis reactor. The oxygen-containing gas may be introduced into the spray pyrolysis reactor via one or more dedicated gas inlet(s) in the spray pyrolysis reactor inlet section and/or may be introduced into the atomizer device in the event that the atomizer device is adapted for such gas feed. For example, the atomizer device may comprise a nozzle to which the source liquid composition and the oxygen-containing gas are delivered so that the nozzle delivers a spray of the source liquid composition in the oxygen-containing gas at the nozzle outlet(s), for passage of the discharged spray of droplets into the interior volume of the spray pyrolysis reactor. It will be correspondingly appreciated that the flow rates of the liquid and the oxygen-containing gas may be widely varied in the broad practice of the present disclosure, and that specific flow rates may readily be determined within the skill of the art, based on the disclosure herein, e.g., by experiment or spray pyrolysis modeling.

The oxygen-containing gas introduced into the spray pyrolysis reactor provides a fluid medium for evaporation of liquid from the droplets of source liquid composition, decomposition and/or reaction of metal salts and/or other reactant precursor (source reagent) materials in the source liquid composition as reactant. Accelerant component(s) may optionally be employed. The oxygen-containing gas thus may be utilized to facilitate the formation of droplets, as well as their evaporation and/or reaction (decomposition). In some embodiments, wherein a nozzle-type atomizer device is employed, all of the oxygen-containing gas flowed to the spray pyrolysis reactor may be fed to the atomizer device. In other embodiments oxygen-containing gas may be flowed to the atomizer device as well as separately to interior volume of the spray pyrolysis reactor via dedicated gas inlet(s). In still other embodiments oxygen-containing gas may be flowed into the spray pyrolysis reactor only through dedicated gas inlet(s) and not to the atomizer device, such as in a spray pyrolysis system in which the source liquid composition is delivered into the interior volume of the spray pyrolysis reactor by a rotary atomizer receiving the liquid source composition from a source of the same. In instances in which oxygen-containing gas is delivered both to the atomizer device and to separate gas inlet(s), the oxygen-containing gas delivered to the atomizer device may be different from the oxygen-containing gas delivered to the gas inlet(s), as for example of a different composition, flow rate, temperature, humidity, and/or pressure. In such event, the gas source for the spray pyrolysis system may include separate gas supplies and/or separate gas conditioning equipment for the respective gas streams to the reactor.

Optionally, the oxygen-containing gas may be heated prior to introduction into the reactor.

The spray pyrolysis reactor may be of any appropriate size and conformation accommodating the spray pyrolysis and pyrolysis operations therein. In various embodiments, the spray pyrolysis reactor includes a reactor vessel of vertically elongate cylindrical form with an upper reactor inlet section and a lower reactor outlet section, defining an interior volume of the reactor through which the droplets in the sprayed source liquid composition fall by gravity and gas flow from the upper inlet section to the lower outlet section. The spray pyrolysis reactor is constructed and arranged to operate at elevated temperature to effect successive droplet evaporation, reaction/decomposition, and mixed metal oxide formation in the interior volume of the spray pyrolysis reactor, so that mixed metal oxide powder and effluent gas may be discharged at the outlet section of the reactor. The spray pyrolysis reactor may be formed of any suitable materials of construction, and may in various embodiments be constructed of materials such as quartz, ceramics, or metal alloys that are compatible with temperature ranges of the spray pyrolysis process. The spray pyrolysis reactor may be of any advantageous shape, form factor, footprint, and geometry characteristics, and such reactor may for example be of cylindrical, square, oval or other geometry depending on the type of furnace employed.

For the purpose of effecting the successive droplet evaporation, reaction/decomposition and mixed metal oxide formation in the spray pyrolysis reactor, the spray pyrolysis reactor may be provided with a thermal management system including suitable heater, monitor, and controller components that are operatively arranged so that temperature in the interior volume of the reactor is maintained at a level or in a range supporting the successive droplet evaporation, reaction/decomposition, crystallization, and mixed metal oxide formation in the reactor.

In various embodiments, one or more heated zone(s) is/are provided in the reactor. In one illustrative multizone reactor arrangement, a first zone of the reactor may be controlled by the thermal management system to operate at a first temperature or within a first temperature range, to initiate evaporation of the sprayed droplets of the liquid source composition, a second zone of the reactor may be controlled by the thermal management system to operate at a second temperature or within a second temperature range, to effect decomposition/reaction, and a third zone of the reactor may be controlled by the thermal management system to operate at a third temperature or within a third temperature range, to carry out the formation, consolidation, crystallization, and/or calcination of the mixed metal oxide product It will be appreciated that in a multizone system, factors such as zone temperature, zone length, gas composition, gas flow rate, source liquid composition, and droplet size will affect the nature and extent of the processing in the first as well as in subsequent zone(s) of the reactor. It will also be appreciated that in the case of some mixed metal oxides, additional heated zones may be advantageous, particularly if a specific crystalline phase of the mixed metal oxide is desired, with progressively increasing temperatures in the respective zones, and the number of zones depending on the requisite degree of crystallinity of the mixed metal oxide product. It will be further appreciated that axial temperature gradients in the reactor may be controllably established and maintained so that the successive droplet evaporation, reaction/decomposition and mixed metal oxide formation are accomplished in a single zone reactor.

The thermal management system may be configured and operated in any suitable manner, with any appropriate system components. In various embodiments, separate heaters may be associated with the respective zones of a multizone reactor, e.g., thermal heating jackets of an electrically resistive or other character, or heat exchange chambers circumscribing the respective zones of the multizone reactor, through which a heat exchange medium is flowed to establish and maintain the desired temperature level, or interiorly disposed heating conduits in the interior volume through which heated fluid is flowed. The separate ones of the respective multiple heaters may be operatively linked with a monitoring and control assembly, which in turn may include a central processor unit receiving temperature monitoring signals from thermocouples or temperature sensors operatively disposed to sense temperature in a corresponding zone of the multizone reactor, by means of signal transmission lines. Such signal transmission lines may be of bidirectional character, such that the central processor unit based on the received temperature monitoring signal responsively transmits a control signal to the heater for the associated zone of the reactor, to modulate the heating of the reactor in such zone by the associated heater so that a set point temperature or temperature range is maintained during operation of the system.

It will be appreciated that the thermal management system may be widely varied in structure and operation, as appropriate to achieve the desired heating in the reactor, whether of a single zone or a multizone character.

In various embodiments, accelerants may be added to the source liquid composition, to exothermically decompose and/or react in the reactor to assist the production of the mixed metal oxide product. In multizone reactor systems, accelerants may be added to decompose or react within a specific temperature zone so that the exothermic decomposition and/or reaction creates an increase in the temperature of such temperature zone (relative to corresponding operation in which such accelerant is not deployed), as well as in subsequent (downstream) reactor zones.

Accelerants may be beneficially employed to create a higher surface area-to-mass ratio, variable pore size, a different pore size distribution, and different total pore volume of the mixed metal oxide, to reduce the number of temperature zones, and/or to achieve a higher zone temperature without having to provide additional heat to the zone, as compared to corresponding spray pyrolysis systems lacking addition of accelerants. In this regard, the choice of accelerant strongly influences the aforementioned catalyst attributes. In various embodiments, accelerants may be employed which decompose into gaseous byproducts at a desired temperature, leaving little or no residue with the mixed metal oxide. Set out in Table 1 below is a listing of possible accelerant combinations of oxidizer, fuel, and solvent components that can be combined to create an accelerated reaction temperature in the pyrolysis reactor. In certain cases, an organic solvent or water-organic solvent blend may also serve as a fuel component. It will be appreciated that the relative proportions of components in the accelerant compositions, such as ratios of metal:fuel:oxidizer components, may be widely varied in the broad practice of the present disclosure, and that advantageous amounts and relative proportions of the respective components for specific spray pyrolysis applications can be readily determined within the skill of the art, without undue experimentation, based on the present disclosure.

TABLE 1

| Oxidizer | Fuel | Solvent |
|---|---|---|
| Metal nitrates | Urea | Water |
| Metal nitrate hydrates | Glycine | Methanol |
| Ammonium nitrate | Hydrazine-based compounds | Ethanol |
| Nitric acid | Organic amines | Substituted alcohols |
| Metal chlorides | Sucrose | Glycerols |
| Metal carboxylates | Glucose | Ketones |
| Metal carbonates | Citric acid | Ethers |
| Metal oxides | Any solvent soluble organic | Water-organic mixtures |
| Metal acetates | Carboxylic acids | Glycols |

It will be understood that the foregoing listing of organic and inorganic components and combinations useful for producing mixed metal oxides in the spray pyrolysis process of the present disclosure is not intended to be limiting, and other components and combinations may be employed in corresponding embodiments of the process and apparatus of the present disclosure, and specific components or component categories may encompass compounds and/or compositions that have multiple function or may be utilized in other categories. For example, both the fuel and the oxidizer can be part of a metal salt in the source liquid composition. As another example, hydrazine-based compounds such as metal hydrazine oxalates may be employed as an oxidizer and not as a fuel. As a still further example, glycerols may also be used as a fuel/carbon source. It will therefore be appreciated that in various embodiments, any suitable combinations of oxidizers, fuels, and/or solvents may be employed to produce the mixed metal oxide having desired chemical and/or physical properties. The temperature at which accelerants react or decompose depends on factors such as: the type of oxidizer, fuel, and/or solvent; source liquid composition concentration of the respective components; and operational parameters of the spray pyrolysis reactor such as gas and liquid flow rates.

Solvents or solvent additives in the source liquid composition may illustratively include any one or more of carboxylic acids, esters, isopropyl alcohol, inorganic acids, amine group solvents, and combinations, mixtures, suspensions, and solutions of two or more of the foregoing. The source liquid composition may be constituted as a solution, suspension, or other liquid composition form.

Figure 1:
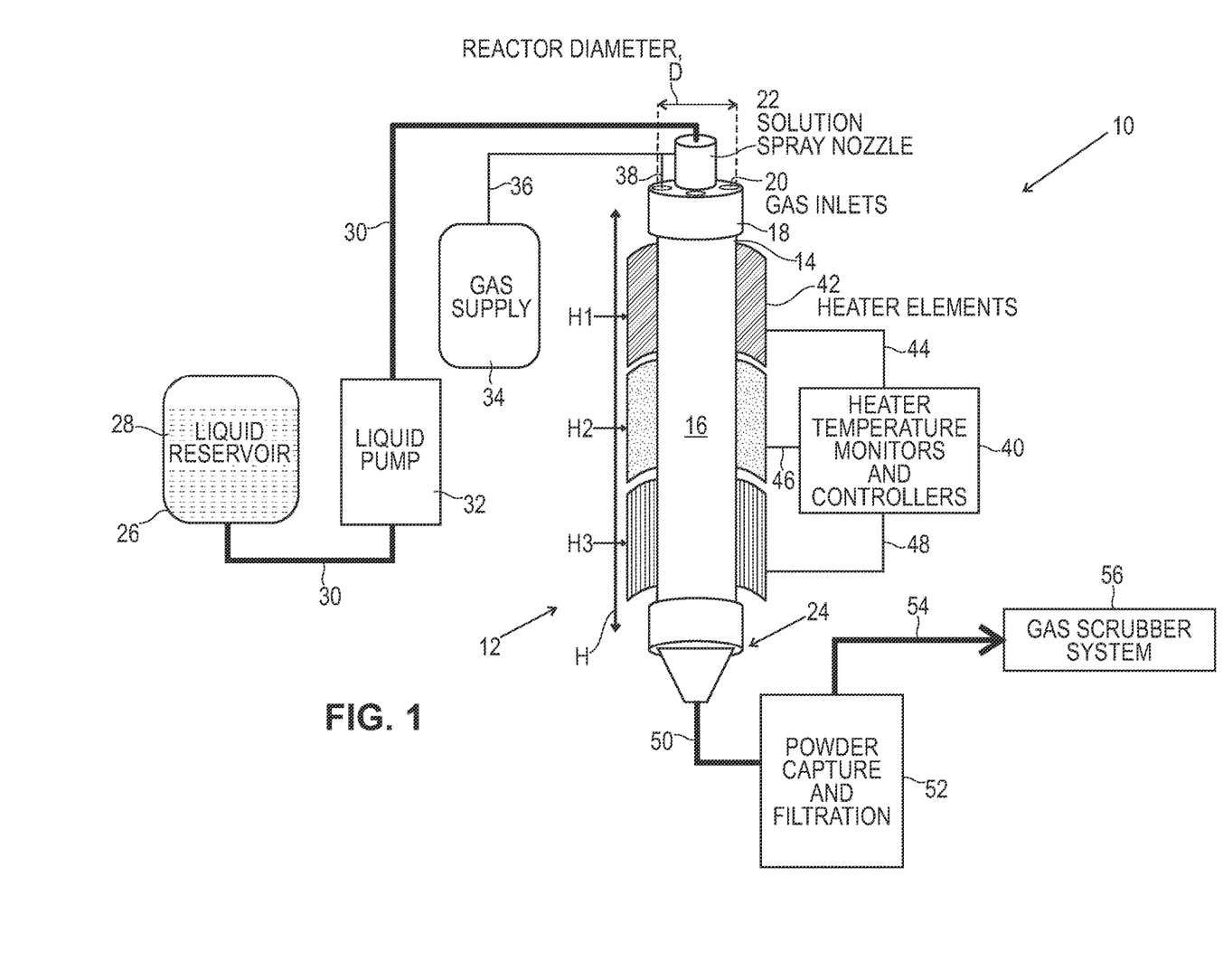
FIG. 1 is a schematic representation of a spray pyrolysis system for production of mixed metal oxide compositions, according to one embodiment of the present disclosure.

Referring now to the drawings, FIG. 1 is a schematic representation of a mixed metal oxide production system 10, according to one embodiment of the present disclosure.

The mixed metal oxide production system 10 includes a spray pyrolysis reactor 12.

The reactor includes a reactor vessel 14 of vertically elongate cylindrical form, defining an interior volume 16 therein. The reactor includes at its upper portion a reactor inlet section 18 containing circumferentially spaced-apart gas inlets 20, through which oxygen-containing gas may be introduced into the interior volume 16 of the reactor. A spray nozzle 22 is arranged to receive source liquid composition from source liquid composition feed line 30 and to produce a spray of droplets of the source liquid composition that is discharged into the interior volume 16 of the reactor vessel 14. The reactor 12 at its lower portion includes a reactor outlet section 24 that is of generally conical shape with a vertically downwardly progressively decreasing diameter.

The mixed metal oxide production system 10 includes a source liquid composition vessel 26 containing source liquid composition 28, from which the source liquid composition is flowed in source liquid composition feed line 30 containing liquid pump 32, to the spray nozzle 22.

A gas source vessel 34 contains an oxygen-containing gas from which the oxygen-containing gas is flowed in gas feed line 36 to the spray nozzle 22 and/or is flowed from gas feed line 36 in gas feed branch line 38 to the gas inlets 24 introduction to the interior volume 16 of the reactor.

The mixed metal oxide production system 10 further includes a thermal management monitoring and control assembly 40 for temperature monitoring of respective thermal zones H1, H2, and H3 of the reactor and responsive modulation of heater elements 42 in order to establish and maintain a desired temperature or operating temperature range in each of the respective thermal zones. The respective thermal zones H1, H2, and H3 are generally of increasing temperature character in the downward direction in the illustrated embodiment, with the temperature, T, progressively increasing so that $T_{H1}<T_{H2}<T_{H3}$. Nonetheless, it will be appreciated that single or multiple temperature zones can be employed in the reactor, and that other temperature sequences may be employed. For example, a three zone furnace (reactor) may be employed, in which $T_{H1}<T_{H2}=T_{H3}$. In various embodiments, the reactor exit passes through a heat exchanger to sufficiently cool the powder and byproduct gases without condensing water vapor in the stream, with temperature being maintained about 100° C. but below 500° C. The heater elements 42 in FIG. 1 may be constituted as thermal heating jackets, circumscribing annular heat exchange chambers through which heating fluid is flowed for heating of the reactor vessel wall and interior volume of the reactor, or the heater elements alternatively may be internally disposed in the interior volume as heating coils or other heat exchange elements. As a further alternative, the vessel wall may be provided with internal heat exchange passages through which heating fluid is flowed.

The thermal management monitoring and control assembly 40 thus may comprise a processor, programmable logic controller, programmed programmable computer, or the like, coupled in signal receiving relationship with thermocouples, temperature sensors, or other temperature monitoring elements or assemblies, which transmit temperature monitoring signals in bidirectional signal transmission lines including upper heater bidirectional signal transmission line 44, middle heater bidirectional signal transmission line 46, and lower heater bidirectional signal transmission line 48 to the processing component(s) of the thermal management monitoring and control assembly, in response to which the processing component(s) generate heater control signals that are sent to the respective heater elements 42 in the bidirectional signal transmission lines 44, 46, and 48 to correlatively adjust the setpoints or operating temperature ranges of the respective upper, middle, and lower heater elements 42, to establish and maintain desired temperatures in each of the respective upper, middle, and lower thermal zones H1, H2, and H3 for the desired production of mixed metal oxide product.

The thermal management monitoring and control assembly 40 may alternatively be configured and/or operated in any suitable manner in which the operations carried out in the interior volume 16 of the reactor 12 are properly monitored and carried out at controlled temperature conditions. For example, the monitoring and control assembly may include signal transmission lines that are connected to valves, flow controllers, and other components of the flow circuitry in the system, as appropriate to control temperatures, pressures, flow rates, and/or compositions in the mixed metal oxide production system.

The mixed metal oxide product powder and associated gases are discharged from the outlet section 24 of the reactor and are flowed in powder and gas effluent line 50 to the powder recovery unit 52 in which the mixed metal oxide powder is separated from the effluent gases, with the separated gases being flowed in gas discharge line 54 to the gas scrubber system 56. The powder recovery unit 52 may for example include solid/gas separation apparatus such as a cyclone separator, a baghouse unit, a filter, an electrostatic precipitator, or a combination of two or more of the foregoing, and/or other separation equipment or components that are arranged to separate and recover the mixed metal oxide powder from the effluent gases. The gas scrubber system 56 may be of any suitable type, and may for example comprise a bed or beds of physical adsorbent and/or chemisorbent, a wet scrubber, or other gas purification unit operations equipment arranged to deplete the effluent gases in deleterious components so that the gases then can be discharged or flowed to other final disposition. For example, the gas scrubber system may purify the effluent gases so that same may be recycled within the mixed metal oxide production system for recirculated gas flow to the spray nozzle 22 and/or gas inlets 20.

The system may further include a dehumidifier in the flow circuitry associated with the gas source and/or recycle of the scrubbed, purified gas from the gas scrubber system 56, to control the humidity of the gas introduced into the interior volume 16 of the reactor vessel 14, to maximize the concentration differential driving force for drying of the liquid composition droplets generated by the spray device and discharged into the interior volume of the reactor vessel.

Although not shown in the specific embodiment of FIG. 1, the mixed metal oxide production system may further include heating elements to heat the source liquid composition and/or the oxygen-containing gas to desired elevated temperature or temperature range for subsequent gas-liquid contacting in the spray pyrolysis reactor. In such respect, the respective liquid composition and gas feed lines to the spray pyrolysis reactor may be heat-traced or otherwise heated, and/or supply vessels for the gas and liquid composition may be heated. Heaters may therefore be employed as part of the thermal management monitoring and control assembly, to provide an integrated thermally managed process system.

In the practice of the present disclosure, wherein the source liquid composition contains metal salts, the process and apparatus of the present disclosure produces an inherent homogeneity of the metal salts in the solvent of the composition that greatly mitigates any non-uniformity within the atomized droplets that might otherwise occur during the evaporation phase of droplet drying operation. The relatively small diameter, corresponding low volume, and corresponding high surface area to volume ratio of the liquid composition droplets allows the relative presence of the solvent portion and metal salts within the solution droplet to remain relatively consistent throughout the droplet as evaporation proceeds. This tendency greatly mitigates any stratification of ingredients that might otherwise occur is the droplet undergoes evaporation, decomposition, and oxide formation.

Figure 2:
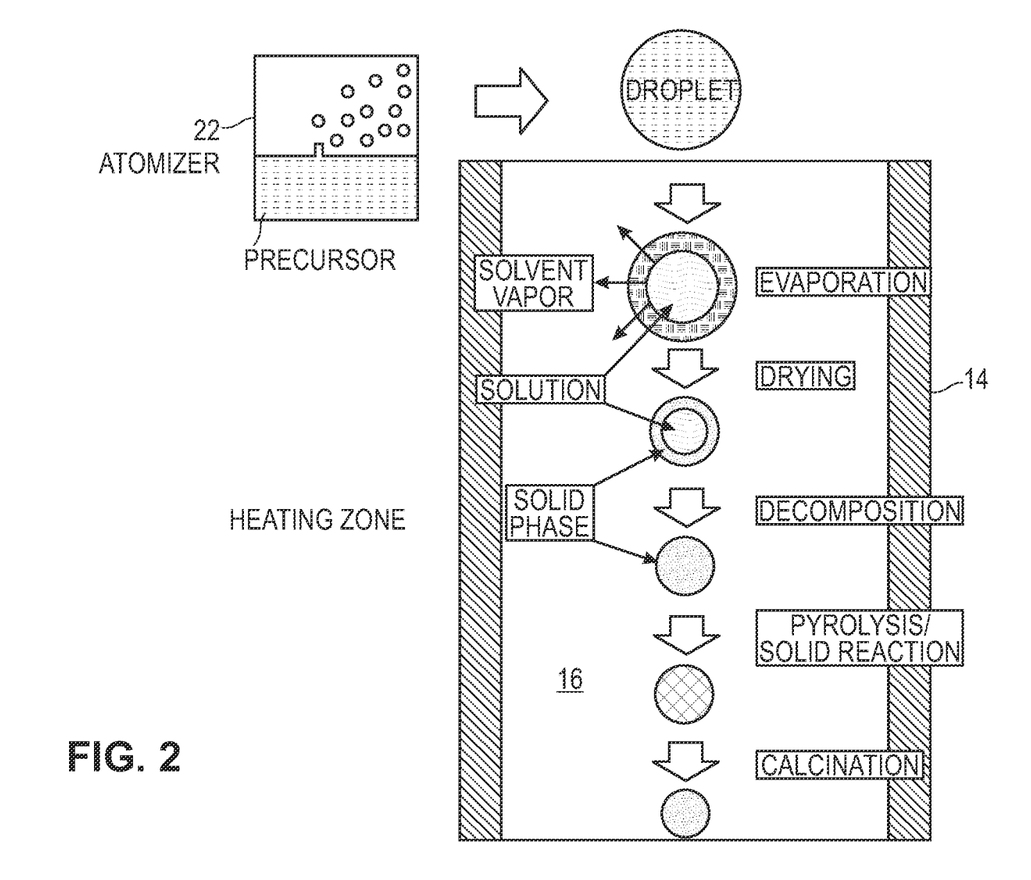
FIG. 2 is a simplified graphical representation of successive process steps in the spray pyrolysis process for producing mixed metal oxide compositions, in an illustrative aspect of the present disclosure.

FIG. 2 is a simplified graphical representation of successive process steps in the spray pyrolysis process for producing mixed metal oxide compositions, in an illustrative embodiment of the present disclosure.

As illustrated in FIG. 2, the source liquid composition (precursor) is atomized by the atomizer 22 to generate droplets that fall downwardly through the interior volume 16 of the reactor vessel 14, passing through stages of (i) evaporation, in which the solvent vapor passes into the oxygen-containing gas, (ii) drying in which the droplet forms a solid phase outer shell through which the liquid continues to permeate and evaporate, (iii) decomposition, (iv) pyrolysis/solid reaction, and (v) calcination, to yield dried particles of the mixed metal oxide composition as a powder product.

The FIG. 2 graphical representation depicts different steps that may occur as a droplet moves through the reactor heating zones, and is simply illustrative of different possible steps that may occur in the spray pyrolysis process. It is to be appreciated that one or more steps may occur simultaneously or in a nearly simultaneous manner.

As an illustrative example of the operation of a spray pyrolysis system and process of the present disclosure, with water as the solvent, the temperature in a first region of the reactor may be in a range of 200° C. to 300° C., and temperature in a second region of the reactor may be in a range of 300° C. to 1200° C., to achieve rapid heat transfer so that solvent evaporation occurs relatively rapidly through the relatively large surface area of the small droplet. The fast reaction time associated with such heating ensures the homogeneity and dispersion of the metal salts in the source liquid composition being maintained within the small droplet by virtue of its relatively small volume. Because the small solution droplet can sustain high heat transfer rates and high rates of solvent evaporation, evaporation, drying, pyrolysis, and sintering occurs in a processing time period of seconds to minutes, as compared to existing batch methods for producing mixed metal oxide compositions, which require time-frames of hours and days.

The simplicity of the process and apparatus of the present disclosure, associated with short processing times and energy savings in relation to conventional approaches, make such process and apparatus highly advantageous for synthesis of heterogeneous catalysts in which support and catalytic metals are contained in a source liquid composition and sprayed together in small droplets. The small size of the droplets, their high surface to volume ratio, and rapid evaporation to the solid phase, ensure that a substantially homogeneous distribution of catalytic metals within the support components is achieved.

By way of further example, a precursor liquid source composition can be prepared in which aluminum nitrate and palladium nitrate (as respective aluminum and palladium source reagents) are dissolved in the precursor solution, and upon spraying, evaporation, precipitation, pyrolysis, and sintering, a solid catalyst product powder is produced with 2 wt % palladium highly dispersed on a high surface area aluminum oxide. The product powder can be formed into pellets or extrudates, or coated onto structural supports, to provide catalyst useful for hydrogenation, dehydrogenation, and oxidation reactions. The liquid source composition may in various embodiments contain a catalytic metal source reagent and/or a catalytic metal promoter reagent. Catalytic source reagents that may be advantageously employed in various implementations of the present disclosure include palladium source reagents, rhodium source reagents, platinum source reagents, and various combinations thereof.

The advantages and features of the disclosure are further illustrated with reference to the following examples, which are not to be construed as in any way limiting the scope of the disclosure but rather as illustrative of embodiments thereof, in a specific application thereof for producing mixed metal oxide catalysts useful as automotive exhaust catalysts. Such automotive exhaust catalysts may be utilized to process exhausts containing a wide range of organic molecules, including for example light alkanes, alkenes, oxygenates (e.g., carbon monoxide, nitrogen oxides), and aromatics.

Example 1

Synthesis of Cerium Zirconate ($Ce_2Zr_2O_7$) as a Support for a Palladium Catalyst 57.2 grams of $Ce(NO_3)_3 \cdot 6H_2O$ and 41.6 grams of $ZrO(NO_3)_2$ were dissolved in 174 ml of deionized water to form a precursor solution. To enhance the decomposition of the metal salts and achieve a higher final calcination temperature, 43.5 grams of glycine was added to the precursor solution. In this Example, cerium ammonium nitrate was the oxidizer, glycine the accelerant and the fuel, and water the solvent. Together, the precursors and the accelerants decompose exothermically at temperature between 200° C. and 600° C.

The precursor solution was sprayed into a 5" diameter quartz reactor using a pneumatic nozzle. The liquid flow rate to the nozzle was 400 ml/hr and the air flow to the nozzle was 35 liters/min. This created an atomized spray cone that was centered at the top of the reactor and oriented directly downward.

Reactor temperature zones were set at 300° C. for the top 1 meter of the reactor, 650° C. for the middle section (approximately 1 meter), and 950° C. for the bottom section of the reactor (approximately 1 meter).

The produced cerium zirconate powder was carried by air flow through the reactor to a filter basket and collected with a 3 micron filtration screen.

Table 2 below shows a comparison of the powder produced by spray pyrolysis versus a commercial powder of the same formula produced by a conventional batch precipitation method. The 90% temperature conversion/removal was determined on catalysts with 2 wt % Pd added to the powders as palladium nitrate, aged at 850° C. lean/rich cycling for 12 hours, and tested for simulated exhaust removal by ramping the temperature from ambient to 500° C. at 5° C./minute. The conversion was measured using a mass spectrometer. The method followed the Aftertreatment Protocols for Catalyst Characterization and Performance Evaluation: Low-Temperature Oxidation Catalyst Test Protocol, The Advanced Combustion and Admission Control (ACEC) Technical Team, Low-Temperature Aftertreatment Group, April 2015, USDRIVE Driving Research and Innovation for Vehicle Efficiency and Energy Sustainability, https://cleers.org/wp-content/uploads/2015_LTAT-Oxidation-Catalyst-Characterization-Protocol.pdf (visited Jan. 30, 2020) for catalyst screening of automotive exhaust conversion catalysts.

TABLE 2

Temperature Required for 90% Removal of Pollutant

| Pollutant | Spray Pyrolysis Process | Commercial Precipitation Process |
| --- | --- | --- |
| Carbon monoxide | 208° C. | 230° C. |
| Propylene | 225° C. | 330° C. |
| Ethylene | 265° C. | 365° C. |
| Propane | 360° C. | 500° C. |
| Nitric oxide | 340° C. | 490° C. |

In general, lower temperatures are preferred and are more advantageous.

Despite being exactly of a same formulation, the cerium zirconate prepared by the spray pyrolysis process of the present disclosure is more active for the low temperature removal of exhaust components than a commercial material prepared by the precipitation method.

In connection with the foregoing, it is possible, and even preferred, to include the catalytic metal in the precursor solution so as to avoid a separate catalytic metal impregnation step (impregnation of palladium in this Example).

Example 2

Single Step Synthesis of an Automotive Exhaust Catalyst 11.6 grams of $Ce(NO_3)_3 \cdot 6H_2O$, 8.7 grams of $ZrO(NO_3)_2$, and 0.34 grams of $Pd(NO_3)_2 \cdot xH_2O$ were dissolved in 70 ml of deionized water to form the precursor solution. To enhance the decomposition of the metal salts and achieve a higher final calcination temperature, 11.8 grams of glycine was added to the precursor solution. In this example, cerium, zirconium, and palladium nitrates (as cerium, zirconium, and palladium source reagents, respectively) were the oxidizers, glycine the fuel, and water the solvent.

The precursor solution was sprayed into a 5" diameter quartz reactor using a pneumatic nozzle. The liquid flow rate to the nozzle was 400 ml/hr and the air flow to the nozzle was 35 liters/min. This created an atomized spray cone that was centered at the top of the reactor and oriented directly downward.

Reactor temperature zones were set at 300° C. for the top 1 meter of the reactor, 650° C. for the middle section (approximately 1 meter) and 950° C. for the bottom section of the reactor (approximately 1 meter).

The produced powder was carried by air flow through the reactor to a filter basket and collected with a 3 micron filtration screen. Because the catalytic metal palladium was sprayed with the support material, this formulation is referred to as a co-spray formulation.

As in the preceding Example 1, the catalysts were aged at 850° C. for 12 hours while exposed to simulated exhaust cycling between a lean/rich composition. The temperatures for conversion/removal of the exhaust components were determined as in Example 1.

The data are shown in Table 3 below, including the data from Table 2 for the Spray Pyrolysis Process of Example 1, wherein a separate impregnation of the catalytic metal is conducted, and including data for the catalyst of the conventional commercial precipitation process.

TABLE 3

Temperature Required for 90% Removal of Pollutant

| Pollutant | Spray Pyrolysis Process | Commercial Precipitation Process | Co-Spray Catalyst |
|---|---|---|---|
| Carbon monoxide | 208° C. | 230° C. | 190° C. |
| Propylene | 225° C. | 330° C. | 191° C. |
| Ethylene | 265° C. | 365° C. | 217° C. |
| Propane | 360° C. | 500° C. | 340° C. |
| Nitric oxide | 340° C. | 490° C. | 289° C. |

In general, lower temperatures are preferred and are more advantageous.

The data in Table 3 illustrate the benefit of using the co-spray methodology for production of automotive exhaust catalyst, as achieving a marked reduction in temperature required for 90% removal of pollutant in relation to the commercial precipitation process catalyst, and a significant reduction in temperature in relation to the catalyst of Example 1 involving a separate impregnation of the catalytic metal (palladium).

While the disclosure has been set forth herein in reference to specific aspects, features and illustrative embodiments, it will be appreciated that the utility of the disclosure is not thus limited, but rather extends to and encompasses numerous other variations, modifications and alternative embodiments, as will suggest themselves to those of ordinary skill in the field of the present disclosure, based on the description herein. Correspondingly, the disclosure as hereinafter claimed is intended to be broadly construed and interpreted, as including all such variations, modifications and alternative embodiments, within its spirit and scope.

What is claimed is:

1. A process for producing a mixed metal oxide crystalline powder, said process comprising:
    generating an atomized spray of droplets of a solution including at least one mixed metal oxide precursor, at least one solvent, and at least one fuel;
    introducing the atomized spray into an upper inlet section of a reactor vessel, the reactor vessel being of vertically elongate form with the upper inlet section and a lower outlet section, defining an interior volume of the reactor through which droplets in the atomized spray fall by gravity and gas flow through the interior volume from the upper inlet section to the lower outlet section of the reactor;
    contacting the atomized spray of droplets in the interior volume of the reactor with an oxygen-containing gas at elevated temperature that supports successive droplet evaporation, reaction/decomposition, mixed metal oxide formation, and calcination, in the gas flow through the interior volume from the upper inlet section to the lower outlet section of the reactor, to yield dried particles of the mixed metal oxide as a crystalline powder product;
    thermally monitoring and controlling temperature in the interior volume of the reactor comprising modulating heater elements to establish and maintain a desired temperature or operating temperature range in each of respective thermal zones in the interior volume of the reactor, wherein the respective thermal zones are of increasing temperature in a downward direction of the interior volume of the reactor;
    discharging the mixed metal oxide crystalline powder product and effluent gases produced by said contacting, from the lower outlet section of the reactor; and
    recovering the mixed metal oxide crystalline powder product from the effluent gases produced by said contacting,
    wherein the at least one fuel decomposes exothermically and/or reacts exothermically at said elevated temperature in said contacting,
    wherein the solution provides a ratio of metal:fuel:oxidizer components that create an accelerated reaction temperature in the contacting by the exothermically decomposing and/or reacting fuel, and metal and oxidizer components, and
    wherein the heater elements are selected from the group consisting of: thermal heating jackets; electrically resistive heaters; heat exchange chambers; heating conduits; heating coils; and reactor vessel wall passages through which heating fluid is flowed.

2. The process of claim 1, wherein the droplets contain a catalytic metal source reagent and/or a catalytic metal promoter reagent in the solution.

3. The process of claim 2, wherein the catalytic metal source reagent is selected from the group consisting of palladium source reagents, rhodium source reagents, platinum source reagents, and combinations thereof.

4. The process of claim 3, wherein the palladium source reagent is palladium nitrate hydrate.

5. The process of claim 1, wherein the solution includes $Ce(NO_3)_3 \cdot 6H_2O$, $ZrO(NO_3)_2$, glycine, and water.

6. The process of claim 1, wherein the atomized spray of droplets include droplets having size in a range of from 0.1 µm to 500 µm.

7. The process of claim 1, wherein the droplets include glycine.

8. The process of claim 1, wherein the droplets include an oxidizer including one or more of a metal nitrate, a metal nitrate hydrate, ammonium nitrate, nitric acid, or metal chloride.

9. The process of claim 1, wherein the fuel in the droplets includes one or more of urea, glycine, a hydrazine-based compound, an organic amine, sucrose, glucose, or citric acid.

10. The process of claim 1, wherein the droplets include a solvent including one or more of water, methanol, ethanol, a substituted alcohol, glycerol, a ketone, or an ether.

11. The process of claim 1, wherein the droplets include one or more of a carboxylic acid, an ester, isopropyl alcohol, and inorganic acid, and amine group solvent, or a combination, mixture, suspension, or solution of two or more of the foregoing.

12. The process of claim 1, wherein the contacting is carried out at temperature in a range of from 200° C. to 1200° C., and wherein the respective thermal zones in the interior volume of the reactor include an upper first thermal zone in which the contacting is carried out at temperature in a range of from 200° C. to 300° C.

13. A process for producing a mixed metal oxide crystalline powder, said process comprising:
    generating an atomized spray of droplets of a solution including at least one mixed metal oxide precursor, at least one solvent, and at least one fuel;
    introducing the atomized spray into an upper inlet section of a reactor vessel, the reactor vessel being of vertically elongate form with the upper inlet section and a lower outlet section, defining an interior volume of the reactor through which droplets in the atomized spray fall by 
gravity and gas flow through the interior volume from the upper inlet section to the lower outlet section of the reactor;

contacting the atomized spray of droplets in the interior volume of the reactor with drying gas at elevated temperature that supports successive droplet evaporation, reaction/decomposition, mixed metal oxide powder formation, and calcination, in the gas flow through the interior volume from the upper inlet section to the lower outlet section of the reactor, to yield dried particles of the mixed metal oxide as a crystalline powder product;

thermally monitoring and controlling temperature in the interior volume of the reactor comprising modulating heater elements to establish and maintain a desired temperature or operating temperature range in each of respective thermal zones in the interior volume of the reactor, wherein the respective thermal zones are of increasing temperature in a downward direction of the interior volume of the reactor, wherein the heater elements are constituted as (i) thermal heating jackets, (ii) heat exchange chambers through which heating fluid is flowed, (iii) heating coils internally disposed in the interior volume, or (iv) internal heat exchange passages in a wall of the reactor through which heating fluid is flowed;

discharging the mixed metal oxide crystalline powder product and effluent gases produced by said contacting, from the lower outlet section of the reactor; and recovering the mixed metal oxide crystalline powder product from the effluent gases produced by said contacting, wherein the contacting is carried out at temperature in a range of from 200° C. to 1200° C., and wherein the respective thermal zones in the interior volume of the reactor include an upper first thermal zone in which the contacting is carried out at temperature in a range of from 200° C. to 300° C., an intermediate second thermal zone at higher temperature than the upper first thermal zone, and a lower third thermal zone at higher temperature than the intermediate second thermal zone, wherein the at least one fuel decomposes exothermically and/or reacts exothermically at said elevated temperature in said contacting, wherein the solution provides a ratio of metal:fuel:oxidizer components that create an accelerated reaction temperature in the contacting by the exothermically decomposing and/or reacting fuel, and metal and oxidizer components, and wherein the heater elements are selected from the group consisting of: thermal heating jackets; electrically resistive heaters; heat exchange chambers; heating conduits; heating coils; and reactor vessel wall passages through which heating fluid is flowed.

* * * * *